United States Patent [19]

Fukuhara et al.

[11] 4,403,568
[45] Sep. 13, 1983

[54] MILK-CLAW INCLUDING INSPECTION MEANS FOR MILK SUCKED FROM COW'S TEATS

[75] Inventors: Shoetsu Fukuhara; Yoshiaki Nakamura; Tadahiro Ibuki, all of Sayama; Masaichi Yamamoto, Tokyo, all of Japan

[73] Assignee: Eisai Co., Ltd., Tokyo, Japan

[21] Appl. No.: 331,774

[22] Filed: Dec. 17, 1981

[30] Foreign Application Priority Data

Dec. 24, 1980 [JP] Japan .............................. 55-183562

[51] Int. Cl.³ ............................ A01J 5/04; A01J 7/00
[52] U.S. Cl. ................................ 119/14.14; 119/14.54
[58] Field of Search ............... 119/14.14, 14.15, 14.17, 119/14.54, 14.55

[56] References Cited

U.S. PATENT DOCUMENTS

| 3,762,371 | 10/1973 | Quayle et al. | 119/14.14 |
| 3,874,337 | 4/1975 | Umbaugh et al. | 119/14.15 |
| 3,884,187 | 5/1975 | Massie et al. | 119/14.14 |
| 4,010,715 | 3/1977 | Robar et al. | 119/14.14 |
| 4,325,028 | 4/1982 | Takahashi | 119/14.14 X |

*Primary Examiner*—Hugh R. Chamblee
*Attorney, Agent, or Firm*—Murray & Whisenhunt

[57] ABSTRACT

A milk-claw includes a collecting chamber for milk is formed within a drum housing and connected to inlets and an outlet for milk respectively; inspection chambers for milk which have been defined adjacent to said collecting chamber for milk by means of a partition wall and in which part of the milk flowing in the collecting chamber for milk through said inlets flows; and electrodes for measuring the electric conductivity of the milk flowed in said inspection chambers for milk; wherein a through hole is perforated in said partition wall interposed between said collecting chamber for milk and inspection chambers so that the milk flowed in said inspection chambers for milk may flow back in the collecting chamber.

9 Claims, 8 Drawing Figures

MILK-CLAW INCLUDING INSPECTION MEANS FOR MILK SUCKED FROM COW'S TEATS

BACKGROUND OF THE INVENTION

This invention relates to a milk-claw provided with inspection means for the milk sucked from cow's teats which are capable of inspecting whether the cow is infected by mastitis or not and if so, its degree in the course of milking.

Generally speaking, mastitis is publicly known as a disease which is most prevalent in cows. And, it is said that mastitis occupies 25% and a fraction of the total sickness, wound and accidents that cows sustain. This mastitis not only lowers the quality of milk but also reduces the output of milk, and further brings about a big economic loss such as disuse of the milk.

In view of this, there is an eager demand for an early discovery of said mastitis. For the purpose of meeting this demand there is proposed a way of detecting mastitis by measuring the electric conductivity of milk. The principle upon which this method is based is that when a cow is infected by mastitis the sodium chloride content of the milk increases and thus the electric conductivity of the milk increases. This method is surely advantageous in that it does not need an especially high level of experties and therefore any one can make said measurement with ease, but is disadvantageous in that it takes a long period of inspection time because of the inevitable necessity of sampling the milk sucked from each teat and inspecting it, respectively, and further that it is impossible to make a continuous inspection throughout the milking operation for discovering abnormality without a moment's delay.

In this situation, there has usually been an earnest desire for the advent of an inspection apparatus capable of achieving the inspection without taking a long period of time as described above and further discovering abnormality quickly in the manner of measuring the electric conductivity of the milk sucked from each teat continuously throughout the milking operation, omitting the above-mentioned troublesome sampling. In order to meet this ardent desire, Japanese Utility Model application 97033/1978 has proposed an inspection apparatus.

As is shown in FIG. 1, this apparatus is one for feeding the milk from teat cups $1a$, $1b$, $1c$ and $1d$ attached to cow's four teats through milk feeding pipes $2a$, $2b$, $2c$ and $2d$ having traps $3a$, $3b$, $3c$ and $3d$ respectively and further a transfer pipe 5 to a milker, wherein a pair of electrodes are installed in each of traps $3a$, $3b$, $3c$ and $3d$ for measuring the electric conductivity of the milk by means of an electric conductivity measuring apparatus 6. An electric conductivity measurement is made on the milk drawn from each of the cow's four teats, individually, and since milk showing a high electric conductivity value indicates the presence of mastitis and the degree of infection, the individual teat infected can be identified.

However, this apparatus is defective in that the milking operation is effected by vacuum suction but the milk sucked from teats is discharged intermittently. Therefore, the said milk does not flow through milk feeding pipes $2a$, $2b$, $2c$ and $2d$ at a fixed rate continuously, and consequently air bubbles are sometimes mingled with the milk within traps $3a$, $3b$, $3c$ and $3d$. And, since due to these bubbles the milk is prevented from contacting the electrodes and further the milk once within the traps is liable to stagnate therewithin and is difficult to exchange it with a fresh milk, it is impossible to measure the electric conductivity thereof correctly and consequently correct inspection of the milk is also impossible.

To cope with this, it may be contemplated to provide each of traps $3a$, $3b$, $3c$ and $3d$ with an apparatus for overcoming the above defect. But, this contemplation is defective in that much trouble and expenses are required therefor.

SUMMARY OF THE INVENTION

It is an object of this invention to provide an inspection apparatus which is capable of eliminating those defects inherent in the above-mentioned conventional inspection apparatus and continuously measuring the electric conductivity of fresh milk from each teat with accuracy and further which is simpler and less expensive.

According to this invention, the above object can be achieved by a milk-claw to measure the electric conductivity of milk in place of the traps which have hitherto been used in the measuring operation.

According to the preferred embodiment of this invention as aforesaid there is provided a milk-claw which is formed within a drum housing and includes a collecting chamber for milk connected to inlets and an outlet for milk respectively; inspection chambers for milk are disposed adjacent to said collecting chamber for milk and are defined by means of a partition wall and in which part of the milk flowing in the collecting chamber for milk through said inlets is allowed to flow; and electrodes attached to the wall surfaces of said inspection chambers for measuring the electric conductivity of the milk within the inspection chambers for milk. A small hole is disposed in the lower part of the partition wall between said collecting chamber for milk and inspection chambers for milk so that the milk may flow from the inspection chambers for milk through said small hole in the collecting chamber for milk.

It is another object of this invention to provide a milk-claw which is capable of keeping the inside thereof clean.

The aforesaid object of this invention can be achieved according to the embodiment of this invention wherein a cover is mounted detachably on the upper part of said drum housing and an inlet for milk is associated with this cover. In other words, the collecting chamber for milk and inspection chambers for milk defined within the drum housing can be kept clean by removing the cover to remove the residual milk therefrom and further cleanse them.

It is a further object of this invention to provide a milk-claw which is capable of measuring the electric conductivity of milk more accurately by preventing bubbles, if any, contained in the milk flowing into milk-claw from flowing in the inspection chambers for milk.

The aforesaid object of this invention can be achieved according to the embodiment of this invention wherein inlets for milk are formed in the upper wall of a drum housing in a manner of slanting downwardly from outside to inside thereof and the lower ends of said inlets for milk are arranged to open above the partition wall provided between a collecting chamber for milk and inspection chambers for milk to thereby let bubble-containing milk flow down in the collecting chamber for milk.

It is still a further object of this invention to provide a milk-claw which is capable of maintaining the flow rate of milk within inspection chambers substantially constant by stopping or controlling the discharge of milk from a collecting chamber for milk as occasion demands.

The aforesaid object of this invention can be achieved by the embodiment of this invention wherein a collecting chamber for milk is defined by a cylindrical partition wall and a bottom wall; this collecting chamber is water tightly and rotatably disposed within a drum housing. An inner outlet for milk is formed in the partition wall of this collecting chamber for milk and an outer outlet for milk is formed in the outer wall of the drum housing at a location opposite to said inner outlet for milk so that the relative location of both outlets for milk may change by the rotation of the collecting chamber for milk. A further embodiment of this invention is wherein an outlet for milk is formed in the bottom wall of a collecting chamber for milk and this outlet is provided with an on-off regulating valve.

BRIEF DESCRIPTION OF THE DRAWING

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
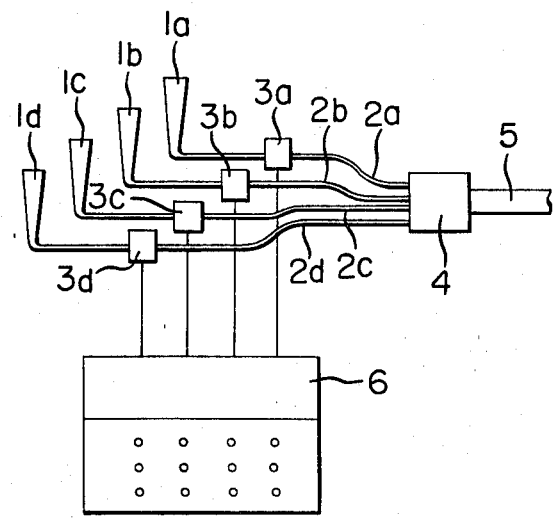
FIG. 1 is a general explanatory view illustrating one embodiment of the prior art inspection apparatus for milk sucked from cow's teats.
Figure 2:
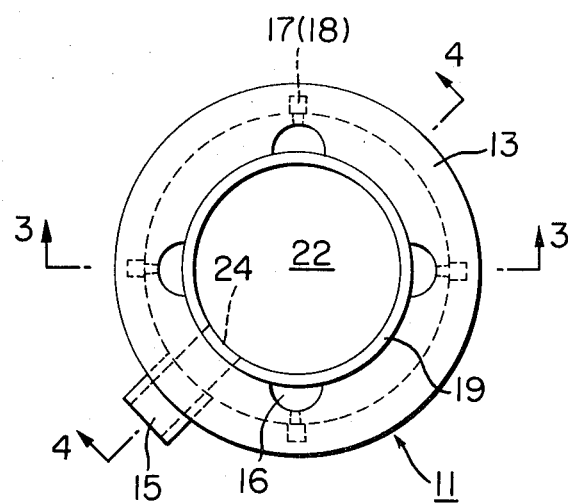
FIG. 2 is a plan view illustrating the portion, exclusive of the cover means, of the first embodiment of the milk-claw according to this invention.
Figure 3:
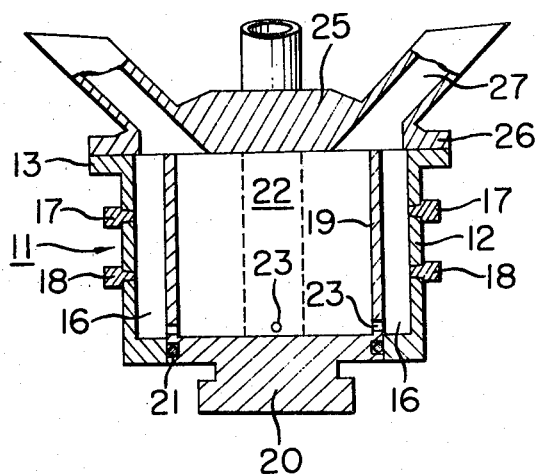
FIG. 3 is a cross-sectional view taken on line 3—3 and viewed in the direction of the arrow of the milk-claw, provided with the cover means, of FIG. 2.
Figure 4:
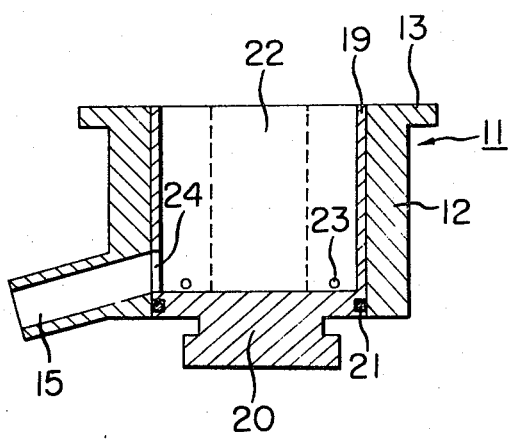
FIG. 4 is a cross-sectional view taken on line 4—4 and viewed in the direction of the arrow of the milk-claw, provided with the cover means, of FIG. 2.

The first embodiment is illustrated in FIG. 2 to FIG. 4, where reference numeral 11 denotes a drum housing. This housing 11 has a cylindrical drum 12. On the upper end of this drum 12 there is formed an upper flange 13. And, the inner surface of the drum 12 is provided with four longitudinal recesses 16 having a circular arc section in the peripheral direction. An outer outlet 15 for milk is formed between any pair of these recesses 16 and at the lower end of the drum 12. The outer peripheral surface of the recess 16 is provided at the upper portion with a pair of electrodes 17 and 18 vertically displaced from each other. These electrodes 17 and 18 are connected to an electric conductivity measuring apparatus (not shown) of the exactly same kind as the electric conductivity measuring apparatus 6.

In this case where the double-pole method is employed as the measuring method, two electrodes are used. However, it is to be noted that a more plural-pole method may be employed and with that method any number of electrodes may be used, i.e. more than two. These electrodes 17 and 18 are made of metals, which are inert from the viewpoint of food sanitation, such as platinum, stainless steel and the like or carbonaceous materials. A collecting chamber 22 for milk is inserted in this cylindrical drum 12 and contacts the bottom wall 20 thereof, said chamber 22 being defined by a cylindrical partition 19 and the bottom wall 20. The outer peripheral surface of the cylindrical partition 19 is water-tight and slidably fitted on the inner peripheral surface of the drum 12 between recesses 16 and in addition the bottom wall 20 is packed with an annular packing 21 and the outer peripheral surface of said bottom wall is water-tight and slidably fitted on the inner peripheral wall of the cylindrical drum 12, whereby each recess 16 may form a separate inspection chamber for milk (the inspection chamber so formed is also designated 16 in the drawings). Small holes 23 are formed at the lower end of the cylindrical partition 19 and at a position opposite to the inspection chamber 16 for milk, and an inner outlet 24 for milk is formed at a position between any pair of these small holes and adjacent to the outer outlet for milk. In this instance, the diameter of the outlets 15 and 24 are determined to be greater than that of the small holes 23 and the ratio of diameters is such that the flow rate of milk discharged from the outlets 15 and 24 is greater than that of milk passing through the small hole 23. Consequently there may be no possibility of the milk within the collecting chamber 22 for milk overflowing into the inspection chamber 16 for milk.

A flange 26 of a cover means 25 is placed on the upper flange 13 and thus the cover means 25 is mounted detachably on the cylindrical drum 12 by using a fitting means (not shown). The cover means 25 is provided with four inlets 27 for milk inclined downwardly toward the inside from the outside thereof and the lower ends of said inlets 27 for milk open above the cylindrical partition 19. And, these inlets 27 for milk are connected to teat cups (not shown) of the same kind as teat cups 1a, 1b, 1c and 1d.

In the practice of milk inspection using the above configured device, milk is supplied to each inlet 27 in the milk-claw. This milk is discharged above the cylindrical partition 19. The thus discharged milk is separated by said cylindrical partition 19. A part of the milk flows into the collecting chamber 22 for milk, and another part thereof flows into the inspection chamber 16 for milk. Even if air bubbles are generated midway, in discharging the milk from outlet 15, the bubbles, which float to the surface of the milk, are introduced in the collecting chamber 22 for milk but do not enter the inspection chamber 16 for milk.

The milk thus entering directly into the collecting chamber 22 for milk and the milk entering into the collecting chamber 22 for milk through small holes 23 from the inspection chamber 16 for milk flow together and are fed to a feeding pipe (not shown) through outlets 24 and 15. In this instance, since the diameters of outlets 24 and 15 are greater than those of small holes 23 as referred to above, the flow rate of the milk passing through the former is substantially equal to or greater than the flow rate of the milk passing through the latter, whereby the milk flows slowly within the inspection chamber 16 for milk and thus the occurrence of air bubbles can be suppressed. This prevents the occurrence of a bad contact between the electrodes 17 and 18 and the milk caused by air bubbles. In addition thereto, since the inspection chamber 16 for milk is always filled with the milk even when the milk flows in intermittently, and in the case where the quantity of milk fed to the milk-claw decreases, this prevents emission of an incorrect electric signal. Thus, the electric conductivity of the milk can be measured correctly and the milk inspection can be achieved with reliable accuracy.

The collecting chamber 22 for milk is designed to turn relative to the housing 11. Therefore, should there be necessity of discontinuing the discharge of milk or regulating said discharge, it will suffice to turn the collecting chamber 22 for milk, thereby closing the outlet 15 or regulating its degree of opening.

If the device after having been thus used is in need of cleaning the inside thereof, the cleaning operation is effected through the sequence of dismantling the cover means 25 from the housing 11 and thereafter removing the residual milk from and cleaning the inside of the device by the use of a suitable cleaner.

Figure 5:
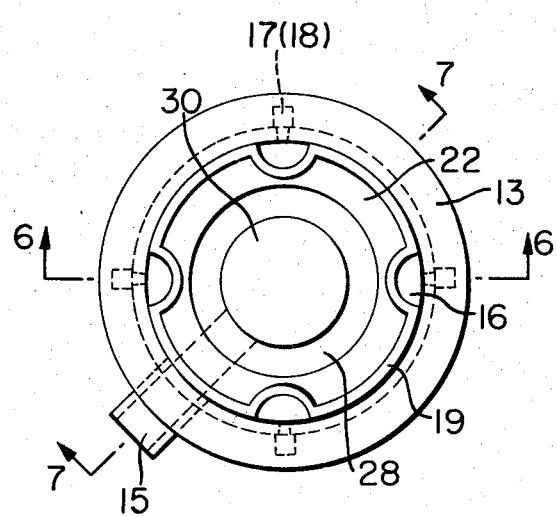
FIG. 5 is a plan view illustrating the portion, exclusive of the cover means, of the second embodiment of the milk-claw according to this invention.
Figure 6:
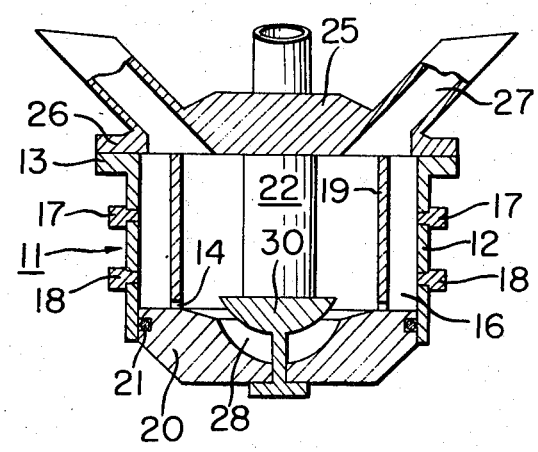
FIG. 6 is a cross-sectional view taken on line 6—6 and viewed in the direction of the arrow of the milk-claw, provided with the cover means, of FIG. 5.
Figure 7:
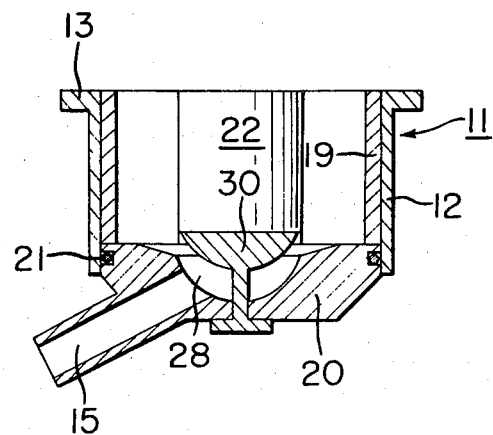
FIG. 7 is a cross-sectional view taken on line 7—7 and viewed in the direction of the arrow of the milk-claw, provided with the cover means, of FIG. 5.

FIGS. 5 to 7 show the second embodiment of this invention. According to this embodiment, the opening or closing and regulation of outlet 15 is arranged to be conducted by providing an outlet 15 protruded to the outside from a recess 28 formed in the center of bottom wall 20 of a collecting chamber 22 for milk. The opening or closing and regulating of said outlet 15 by means of a hand-operated valve or driven valve (not shown) incorporated in recess 28. This avoids the manual control disclosed in connection with the first embodiment of the invention, i.e. that of turning the collecting chamber 22 for milk relative to the drum housing 11.

In this embodiment, furthermore, it is to be noted that an inspection chamber 16 for milk is defined by an inward, enlarged part of a cylindrical partition 19 and a cylindrical drum 12.

The second embodiment as aforesaid may be carried out in the exactly same manner as the first embodiment except that the opening and closing and regulation of the outlet 15 is conducted in the different way as referred to above.

Figure 8:
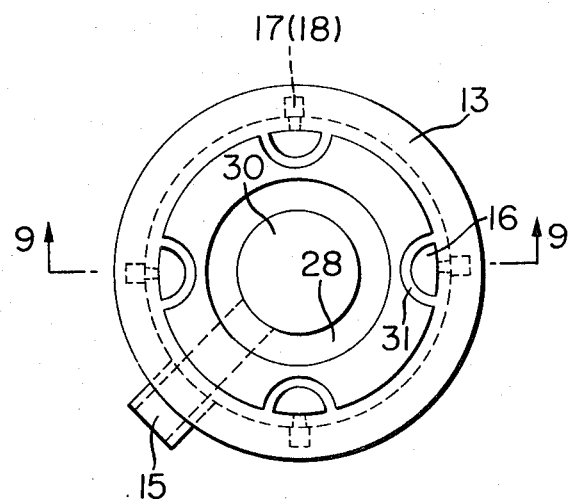
FIG. 8 is a plan view of the portion, exclusive of the cover means, of the third embodiment of the milk-claw according to this invention.

The third embodiment shown in FIG. 8 is exactly same as the second embodiment except that a means constituting the inner wall of a collecting chamber 16 for milk is formed not by a cylindrical partition 19 of said chamber 16 but by a partition 31 attached to the inner surface of a cylindrical drum 12.

Although particular preferred embodiments of the invention have been disclosed hereinabove for purposes of illustration, it will be understood that variations or modifications thereof which lie within the scope of the invention as defined by the appended claims are fully contemplated.

What is claimed is:

1. A milk-claw provided with inspection means for the milk sucked from cow's teats, comprising: a collecting chamber being formed within an airtight drum housing and connected to inlets for milk formed in the upper wall of said housing and an outlet for milk formed in the lower wall of the housing respectively; inspection chambers for milk which lie adjacent to and partitioned from said collecting chamber for milk by means of a partition wall such that a part of the milk flowing to the collecting chamber for milk through said inlets is allowed to flow into said inspection chambers; electrode means attached to the wall surfaces of said inspection chambers and functioning to meausre the electric conductivity of the milk within the inspection chambers for milk; and a small hole provided at the lower part of the partition wall between said collecting chamber and inspection chambers whereby milk within the inspection chambers is allowed to flow in the collecting chamber.

2. A milk-claw according to claim 1, wherein the upper wall of the drum housing comprises a cover means mounted detachably on the upper part of the side wall of said housing.

3. A milk-claw according to claim 1, wherein said inlets for milk are formed in the upper wall of said drum housing in a manner of slanting downwardly from outside to inside thereof and the lower ends thereof are arranged to open above the partition wall disposed between said collecting chamber and inspection chambers.

4. A milk-claw according to claim 1, wherein said collecting chamber is cylindrical, said inspection chambers are four in number and formed at equal intervals in the peripheral direction on the outer periphery of said collecting chamber, and said inlets are arranged to open above the partition wall disposed between said collecting chamber and inspection chambers.

5. A milk-claw according to claim 4, wherein the upper wall of the drum housing comprises a cover means mounted detachably on the upper part of the side wall of said housing.

6. A milk-claw according to claim 4, wherein said inlets are formed in the upper wall of said drum housing in a manner of slanting downwardly from outside to inside thereof.

7. A milk-claw according to any one of claims 1 to 6, wherein said collecting chamber has a cylindrical partition wall and a bottom wall and is water tightly and rotatably disposed within said drum housing, said cylindrical partition wall being provided at the lower part with an inner outlet for milk, said inspection chamber being formed of longitudinal gaps between the cylindrical partition wall of the collecting chamber and partly outwardly enlarged outer wall portions of said drum housing, and the outer wall of said drum housing being provided with an outer outlet for milk which is designed to have communication with an inner outlet for milk when said collecting chamber is disposed at a predetermined position.

8. A milk-claw according to any one of claims 1 to 6, wherein said collecting chamber has a cylindrical partition wall and a bottom wall and is water tightly disposed within said drum housing, said bottom wall is provided with an outlet for milk having associated therewith an on-off valve, and said inspection chambers formed of longitudinal gaps between the outer wall of said drum housing and the partly inwardly enlarged partition wall of said collecting member.

9. A milk-claw according to any one of claims 1 to 6, wherein said collecting chamber is formed of an outer wall of said drum housing and a bottom wall attached water tightly to said outer wall, said bottom wall being provided with an outlet for milk having associated therewith an on-off valve, and said inspection chambers being formed by longitudinal gaps between the outer wall of said drum housing and the partition wall provided on the inner surface of this outer wall.

* * * * *